United States Patent [19]

Boyd et al.

[11] 3,922,622

[45] Nov. 25, 1975

[54] ELASTIC WAVEGUIDE UTILIZING AN ENCLOSED CORE MEMBER

[75] Inventors: Gary Delane Boyd, Rumson; Larry Allen Coldren, Leonardo, both of N.J.

[73] Assignee: Bell Telephone Laboratories, Incorporated, Murray Hill, N.J.

[22] Filed: Aug. 12, 1974

[21] Appl. No.: 496,645

[52] U.S. Cl. .................. 333/30 R; 310/9.5; 310/9.8; 333/95 R

[51] Int. Cl.²... H03H 9/02; H03H 9/26; H03H 9/30

[58] Field of Search ........... 333/30 R, 71, 72, 30 M, 333/95 R; 310/9.5, 9.8; 350/96 R, 96 WG

[56] References Cited

UNITED STATES PATENTS

| | | | |
|---|---|---|---|
| 2,702,885 | 2/1955 | Shapiro | 333/30 R |
| 2,727,214 | 12/1955 | McSkimmin | 333/30 R |
| 3,098,204 | 7/1963 | Brauer | 333/30 R |
| 3,231,836 | 1/1966 | Eisner | 333/30 R |
| 3,259,858 | 7/1966 | Meitzler | 333/30 R |
| 3,327,252 | 6/1967 | Hare | 333/30 R |
| 3,488,602 | 1/1970 | Seidel et al. | 333/30 R X |
| 3,558,755 | 6/1971 | Sawada et al. | 333/30 R |
| 3,659,915 | 5/1972 | Maurer et al. | 350/96 |
| 3,719,907 | 3/1973 | Adler | 333/30 R |
| 3,736,532 | 5/1973 | Armenakas | 333/30 R |
| 3,753,157 | 8/1973 | Ash et al. | 333/30 R X |
| 3,778,132 | 12/1973 | Pinnow et al. | 350/96 |
| 3,785,717 | 1/1974 | Croset et al. | 333/95 R X |
| 3,824,505 | 7/1974 | Borner | 333/30 R |

OTHER PUBLICATIONS

Biot–"Propagation of Elastic Waves in a Cylindrical Bore Containing a Fluid" in "Journal of Applied Physics," Vol. 23, No. 9, Sept. 1952, pp. 997–1005.

Waldron–"IEEE Trans. on Microwave Theory and Techniques," Vol. MTT-17, No. 11, Nov. 1969, pp. 893–904.

Stern–"IEEE Trans. on Microwave Theory and Techniques," Vol. MTT-17, No. 11, Nov. 1969, pp. 853–844.

*Primary Examiner*—James W. Lawrence
*Assistant Examiner*—Marvin Nussbaum
*Attorney, Agent, or Firm*—C. S. Phelan

[57] ABSTRACT

Guided elastic waves are propagated in a waveguide, including a central core region and an outer cladding region. The bulk shear elastic wave velocity in the cladding region is larger than in the core region. The thickness of the cladding region is sufficient so that the particle displacement profile falls nearly to zero before reaching the outer surface of the cladding region. The waveguide is mounted in any suitable medium for protecting it against external mechanical shock and for providing any necessary mechanical support therefor. Different guide configurations and both torsional mode and radial mode transducers are shown.

30 Claims, 14 Drawing Figures

ELASTIC WAVEGUIDE UTILIZING AN ENCLOSED CORE MEMBER

BACKGROUND OF THE INVENTION

1. Field of the Invention

This invention relates to elastic waveguides and it relates, in particular, to fiber-type guides for propagating elastic waves in an inhomogeneous medium. Elastic waves in solid media are also commonly denominated acoustic, or ultrasonic, waves even though they are often not directly audible to the human ear.

2. Description of Prior Art

Waveguides for propagating elastic waves should have a number of desirable properties; and paramount among those properties are low loss, low velocity dispersion in the waveguide across the frequency band of interest, and good signal isolation from external supports.

Elastic wavguides can take a variety of different forms; but the ones of particular interest here are the rod, wire, or fiber types because they are convenient for use as delay lines. These kinds of waveguides are to be distinguished from bulk wave devices which are similar in appearance but through which elastic waves are reflected or steered in a plane wave fashion without employment of the systematic wave-wall interaction which characterizes waveguides in which the signal frequency band propagated depends upon the guide cross-sectional configuration. The cross section of the bulk wave devices was necessarily many wavelengths wide to allow diffractionless propagation of a beam with minimal interaction with the structure walls except for discrete beam folding reflectors. A wide variety of materials can be employed in elastic waveguides depending upon the frequency band, loss, dispersion, or delay characteristics sought for a particular application. Metallic wire or rod waveguides usually provide satisfactory service for frequencies up to about one megahertz because they have the desired propagation characteristics and they are relatively insensitive to the type of mechanism used for supporting the waveguide. For higher frequencies, nonmetallic materials become more attractive because they have lower intrinsic losses and are easier to fabricate in the small sizes required for these higher frequencies.

However, at such higher frequencies the waveguide becomes quite sensitive to the application of mechanical supports. For example, the application of support devices to the waveguide alters the propagation characteristic of the guide in ways which adversely affect dispersion and loss. One particular such alteration is a change in the waveguide particle displacement profile with respect to waveguide radius. The provision of devices for supporting the waveguide and for protecting the waveguide from external mechanical shock usually disturbs the particle displacement profile and thereby causes coupling of energy into other propagating modes or nonguiding modes. This results in a loss of energy from the desired mode and the creation of spurious signals at the output. In summary, it has usually heretofore beeen considered necessary to leave an elastic waveguide, or other elastic wave transmitting device, relatively unfettered in order to allow the least disturbance of energy transmitted through the device.

It may be helpful to mention some of the techniques heretofore employed to mitigate the waveguide support problem for elastic waveguides. For example, discrete point or line supports have been provided to minimize the propagation-disturbing effects of the supports; but they usually still lead to insertion loss and introduction of spurious signals as noted above. Efforts have also been made to configure waveguides so that the only necessary means of support is provided by contact with the transducers at either end of the waveguide, rather than with the guide itself. However, such guides are usually limited in length and are sensitive to possible damage from external mechanical shock. In a third structure for avoiding mechanical support problems for a small relatively delicate waveguide, elastic surface waves are propagated along the inside surface of an elongated capillary. In this case, however, the guide must be evacuated in order to avoid air loading, i.e., viscous damping by air in contact with the surface used for propagation. In addition, the transducing arrangements are fairly complex.

It is known in the art, for example, in the U.S. Pat. No. 2,727,214 to H. J. McSkimin, to provide an absorptive coating on bulk wave delay line rods which are not operated as waveguides. The coating is employed to smooth out the loss characteristics of the delay line by absorbing waves that may be incident on the walls. This type of absorbing material is usually provided in addition to delay line supports.

It is also known in the art, for example, in the U.S. Pat. No. 3,736,532 to A. E. Armenakas, to provide a waveguide rod with various types and configurations of cladding material having a thickness and bulk shear wave velocity such that the propagated energy spreads from a central core region and extends through one or more cladding layers in order to achieve a desired waveguide dispersion shaping characteristic. The purpose of the device is to provide a dispersive delay line rather than to provide a low dispersion delay line in which the cladding is provided for isolation of the core confined energy. In the same patent a modified form of the dispersive waveguide is arranged so that an elastic surface wave can be propagated on an inner surface of a clad, hollow cylinder wherein the cladding is a material of larger shear velocity than the core cylinder; but again the layer thickness and velocity are chosen to provide a dispersive delay line.

It is further known in theory that an elastic wave can propagate in a rod of a first material which is surrounded by an infinite extent medium of a second material. An example of teachings of this type is found in "Some Problems in the Theory of Guided Microsonic Waves" by R. A. Waldron, *IEEE Transactions on Microwave Theory and Techniques*, Nov. 1969, pages 893–904. Such a propagation arrangement has heretofore been considered unsuitable for practical devices because of the specified infinite extent and, thus, rigidity of the massive medium. On the other hand, a single-material rod was deemed undesirable because it was not self-supporting.

Optical fiber guides made of a clad core are known in the art to provide an enhanced optical guiding effect. They are also known to have utilized a radially graded index of refraction to lower the dispersion of the guiding effect. However, the utility of such an inhomogeneous medium has heretofore been considered to be limited to guiding electromagnetic waves.

Accordingly, it is one object of the present invention to improve waveguides for elastic waves at high frequencies.

A further object is to reduce waveguide support problems for elastic waveguides.

It is another object to reduce air loading effects in elastic waveguides.

Yet another object is to facilitate transductive coupling to elastic waveguides.

SUMMARY OF THE INVENTION

The foregoing and other objects of the invention are realized in an illustrative embodiment in which an elongated central core region and a core-enclosing region therearound are composed of materials in which elastic waves can be propagated. The two regions are composed and configured with respect to one another to focus and contain energy predominently within the core region. Furthermore, the enclosing region thickness is a finite value which is dependent upon the particle displacement profile of the combined core and enclosing regions to the extent that the thickness of the enclosing region must be large enough that the elastic wave particle displacement falls to a small value at a waveguide radius which is less than the outer radius of the enclosing regions.

It is one feature of the invention that a waveguide of the type outlined is advantageously supported by any convenient means not imposing undue strains on the core and cladding materials; and in one embodiment the supporting means is a body of epoxy in which the waveguide is suspended prior to hardening of the epoxy.

It is another feature of the invention that transducers are more easily applied to the waveguide than was heretofore the case because the overall waveguide diameter is larger than were the diameters of prior cylindrical elastic waveguides operating in a single mode regime. Also the excitation of the waveguide mode requires less critical transducer design and allows greater efficiency than was heretofore the case.

It is a further feature that in one embodiment of the invention the core-enclosing region is a cladding on the core, and the core and cladding regions are made of the same materials except that at least one of them is doped with a different material. The doping concentration is sufficient to change the bulk elastic shear wave velocity difference between the two regions, so that such velocity in the core region is less than the velocity in the cladding region.

A still further feature of the invention is that in one embodiment the aforementioned doping concentration levels are graded to different levels at different waveguide radii for thereby increasing the range of low waveguide dispersion around a frequency which is approximately 1.75 times greater than the waveguide cutoff frequency $f_{co}$.

Yet another feature is that in one embodiment, the core and enclosing materials are chosen so that the elastic bulk shear velocity in the enclosing region is greater than the elastic bulk longitudinal velocity in the core region.

It is a feature of a further embodiment that the enclosing region is a cylindrical tube in which the core region is supported in spaced relation with the tube by structures which mechanically focus acoustic wave energy toward the core region in the manner of cutoff waveguide supports so that particle displacement for the waveguides falls nearly to zero at the inner radius of the supporting tube.

BRIEF DESCRIPTION OF THE DRAWING

A more complete understanding of the invention and the various features, objects, and advantages thereof may be obtained from a consideration of the following detailed description and the appended claims in connection with the attached drawings in which:

DETAILED DESCRIPTION

Figure 1:
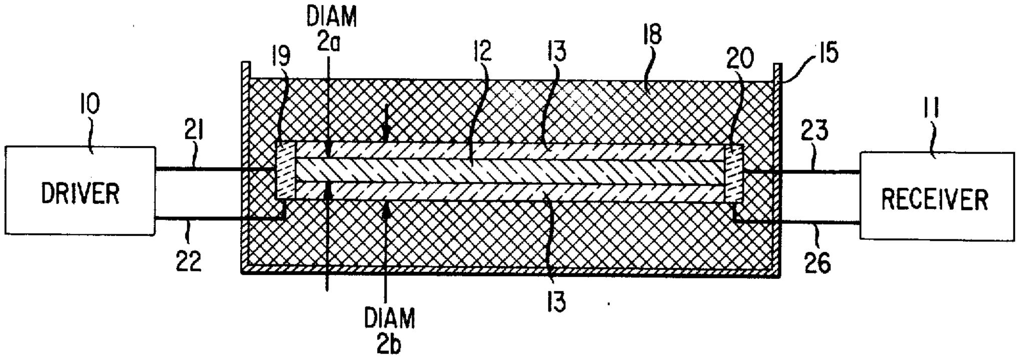
FIG. 1 is a simplified side sectional view of a delay line utilizing the present waveguide invention.

In FIG. 1 a waveguide in accordance with the present invention is illustrated as a delay line which is coupled between the output of a driver 10 and a receiver 11. The driver is advantageously a source of either digital or analog high frequency signals. In one embodiment driver 10 supplies a train of pulses comprising a digital representation of an analog signal; and, for example, represents a signal bandwidth of 16 megahertz (MHz) centered at about 35 MHz in a waveguide with a lower cutoff frequency of about 20 MHz. Receiver 11 is any suitable utilization circuit appropriate to the signals provided by driver 10. The waveguide delay line comprises an elongated core member 12 of radius *a* and an enclosing member, such as a layer of cladding material 13 which covers all surfaces of the core 12 except the end surfaces thereof. The cladding material radius is *b*. Both the core and the cladding are made of a material in which elastic waves can be propagated, and the core and cladding materials are selected so that the cladding bulk shear velocity is larger than the core bulk shear velocity. In one embodiment the velocities are advantageously close in order that the waveguide should be characterized by a low waveguide frequency dispersion similar to that of torsional waves on a plain unclad rod, or fiber. However, the velocities should differ sufficiently to effect reasonable energy confinement. The core and cladding materials also advantageously have substantially the same temperature coefficient of expansion in anticipated ranges of manufacturing and operating temperatures.

Figure 2:
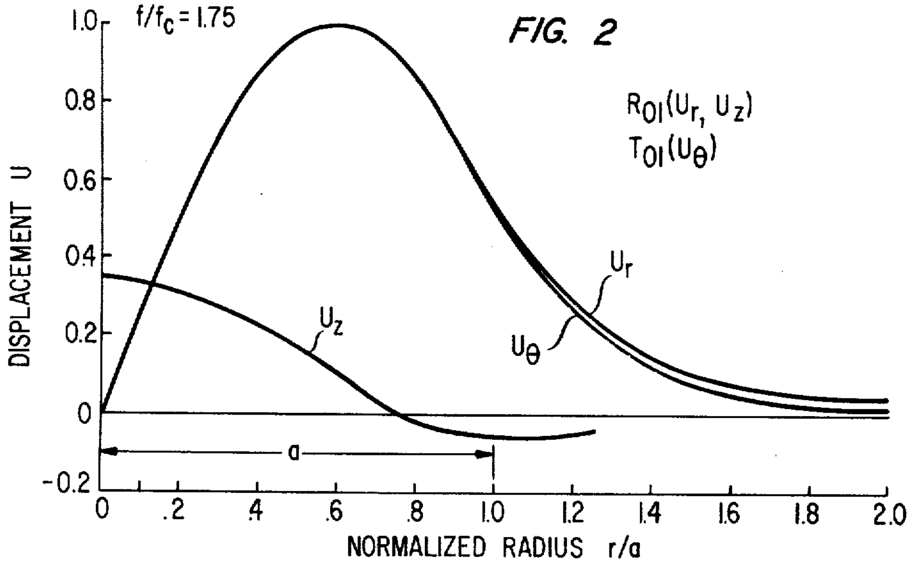
FIG. 2 is a particle displacement versus normalized waveguide radius diagram for the torsional and radial modes of a waveguide of the type shown in FIG. 1.

The composite core and cladding have a particle-displacement-versus-waveguide-radius profile, for the fundamental torsional and radial modes of propagation, of a type illustrated in FIG. 2. That diagram represents calculated data for an assumed velocity difference of about 3.8 percent and a frequency of about 1.75 $f_{co}$, where $f_{co}$ is the waveguide cutoff frequency, to be subsequently discussed in more detail. Displacement U is in arbitrary units with maximum displacement indicated as unity. Radius $r$ is normalized by the radius $a$ of the core 12.

The first angularly independent radial mode $R_{01}$ has a radial displacement component $U_r$ and a longitudinal displacement component $U_z$ which are separately plotted. The first torsional mode $T_{01}$ has only an angular displacement component $U_\theta$ which is approximately the same configuration as $U_r$. It can be seen that the radial and torsional particle displacements in the center of the core cross section, i.e., at zero waveguide radius, are zero. The radial and torsional particle displacements increase to a peak value at a radius which is within the core, i.e., $r < a$, and then decay back to a near zero displacement value at the radius of the outer surface of the cladding 13.

It has been found in accordance with one aspect of the present invention that an elastic waveguide, structured as outlined in connection with FIG. 1, is substantially immune to touching of the outer surface of the waveguide insofar as distortion of the particle displacement profile is concerned. It is believed that the reason for this immunity is that such touching cannot significantly affect the low particle displacement profile portion at the waveguide outer surface and thus does not noticeably alter the energy propagation characteristic of the waveguide.

Figure 3:
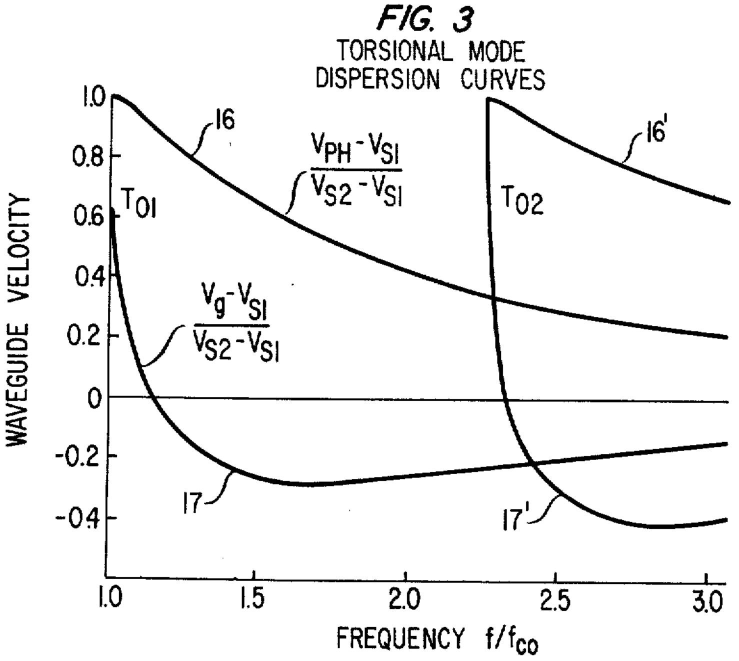
FIG. 3 includes dispersion curves for a waveguide in accordance with the present invention.

FIG. 3 depicts normalized velocity-difference-versus-normalized-frequency characteristics for the first, i.e., lowest order, guided angularly independent torsional mode $T_{01}$ of elastic wave propagation in the waveguide of FIG. 1. The second mode $T_{02}$ is also partially shown and indicates that for input frequency less than about $f/f_{co} = 2.25$ for the illustrated embodiment modes higher than $T_{01}$ cannot propagate. Radial modes corresponding to the illustrated torsional modes have similarly shaped characteristics.

The normalized velocity difference ordinate in FIG. 3 is the difference between waveguide phase velocity $v_{PH}$ (or group velocity $v_g$) and core shear velocity $v_{S1}$ divided by the difference between the cladding shear velocity $v_{S2}$ and core shear velocity $v_{S1}$. The latter difference was approximately 3.8 percent of $v_{S1}$ for the example of FIG. 3. On the other hand, the normalized frequency of the abscissa is realized as the ratio of the frequency of propagation to the waveguide lower cutoff frequency $f_{co}$. That cutoff frequency is the frequency below which the signal wavelength becomes so large that substantial energy spreads into the cladding and any surrounding medium so that the device no longer operates in a guided mode. Stated differently, cutoff frequency for the first guided torsional mode can be shown to be $$f_{c_{T_{01}}} \approx \frac{0.27 v_{S2}}{a\sqrt{\frac{\Delta v}{v_{S1}}}}$$

where $\Delta v$ is $v_{S2} - v_{S1}$ and $$\frac{\Delta v}{v_{S1}}$$

is much smaller than unity.

Two curves 16 and 17 are shown in FIG. 3 for the $T_{01}$ mode. The upper curve 16 represents the normalized difference between phase velocity and the core shear velocity. It can be seen that the phase velocity decreases from the bulk shear velocity in the cladding at cutoff and asymptotically approaches the bulk shear velocity in the core as the normalized frequency increases. Curve 16 also indicates the quality of guiding in that for any given frequency the larger the difference between the velocity unity ordinate and the curve 16 the stronger is the guiding effect. That is, the guiding improves as the phase velocity becomes relatively smaller than the cladding shear velocity.

The lower curve 17 in FIG. 3 represents the normalized difference between group velocity and the core shear velocity. This curve is representative of dispersion in a waveguide in which a signal including a band of frequencies is propagated. It is observed in FIG. 3 that the greatest dispersion i.e., slope of curve 17, indicated by curve 17 occurs in the lower normalized frequency ranges below approximately the $1.5 f_{co}$ point. The curve displays a slope inversion at about $f = 1.75 f_c$ and thereafter approaches the abscissa at increasingly larger frequencies. Near that point of slope inversion, dispersion is low because the normalized velocity curve has zero slope.

It has been found that the low-dispersion region around $1.75 f_{co}$ is well within the single-mode operating region of the waveguide of FIG. 1. Furthermore, the bandwidth of the region can be increased by employing a diffused core-clad interface. That is, for example, the waveguide is constructed so that the core and the cladding are of the same basic material; and the doping concentration is graded with waveguide radius as will be subsequently mentioned in greater detail.

Reference has been made to single-mode operation. Other modes begin to appear at higher frequencies at about $2.25 f_{co}$, as noted previously. It is not necessary that all additional modes be avoided since the practical criterion is a compromise between the energy coupled to other modes and the reduced dispersion realized. That is, for a particular application, there should not be such a high level of energy coupling to other modes that the effects of mode to mode dispersion become significant.

Returning to FIG. 1, electromechanical signal transducers 19 and 20 are intimately associated with the respective ends of the waveguide. For example, where discrete transducers are employed, they are advantageously bonded to the end faces of the waveguide. These transducers are advantageously piezoelectric disks, or plates, to be described in greater detail. In brief, however, they are adapted for launching, in the clad waveguide illustrated in FIG. 1, an elastic wave representing the successive time variations of the electric signal wave applied from the driver 10 by leads 21 and 22 to the input transducer 19 and derived at the output transducer 20 for application by way of leads 23 and 26 to the receiver 11. Transducers 19 and 20 are advantageously of the same, or slightly greater, outside diameter as the core region 13. However, in some frequency ranges, e.g., above 100 MHz, the use of enlarging end tapers makes the application of transducers more convenient; and that aspect will be subsequently discussed.

In order to support the waveguide of FIG. 1, and also to protect it from external mechanical shock which could fracture or otherwise seriously damage the waveguide, it is advantageously suspended in a cushioning medium 18 in a container 15. Selection of a medium is not critical. It can, for example, be a vibration-absorptive wax, such as sealing wax, in which the waveguide is submerged while the wax is in a molten state. Then it holds the waveguide firmly when the wax assumes its solidified condition. Alternatively, any of the many commercially available epoxy glues could also be used. The medium 18 protects the waveguide from external mechanical forces. Because of the aforementioned relationship between cladding region thickness and particle displacement, the medium does not affect energy propagation in the waveguide except to absorb spurious signals in higher order cut-off modes. Alternatively, clamps could be used for support as long as they do not so crush the waveguide as to impose internal strains that substantially distort the FIG. 2 particle displacement profile.

Figure 4:
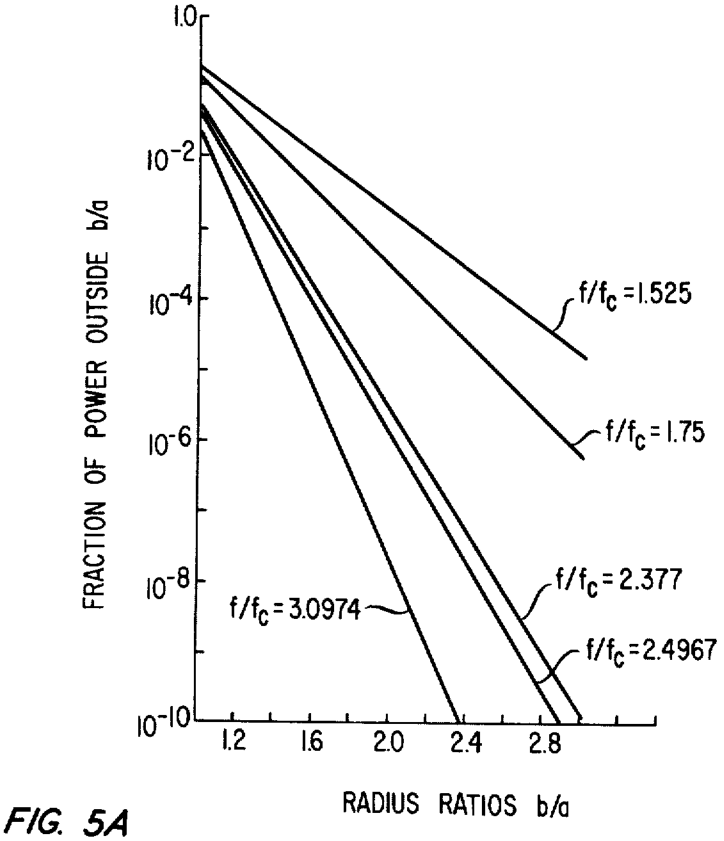
FIG. 4 is a plot of representative calculations depicting the quality of energy containment in a waveguide in accordance with the present invention.

Before considering transducer details, it is interesting to look into the extent of energy leakage through the cladding 13. FIG. 4 is a diagram of representative calculations, for an arbitrary transverse cross section of the FIG. 1 waveguide, of the fraction of transmitted energy contained outside of a hypothetical cladding periphery versus the ratio $b/a$ of cladding radius to core radius for different values of normalized frequency. A velocity difference of about 3.8 percent and the torsional mode of propagation were assumed for FIG. 4. The particular materials employed in the waveguide have only a small effect on the data plotted in this manner. It can be seen that the energy outside the waveguide decreases with both increases in the radius ratio $b/a$ and increases in the normalized frequency. For one specific doped core case to be discussed, $b/a = 2$, and in the normalized frequency range of about 1.5 to 2.25, where there is low dispersion, the fraction of power leaked ranges downward by about two orders of magnitude from roughly 1/700 at the lowest frequency. This kind of penetration has been found to be insufficient to cause an interaction with waveguide support means that results in significant disturbance of the propagation mode in the waveguide.

Figure 5A:
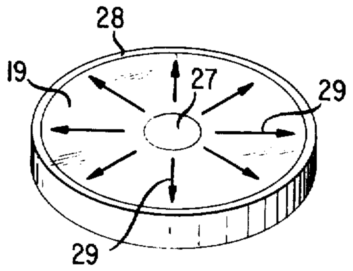
FIGS. 5A and 5B are perspective views of poling and driving arrangements, respectively, for a transducer that is useful in the embodiment of FIG. 1.
Figure 5B:
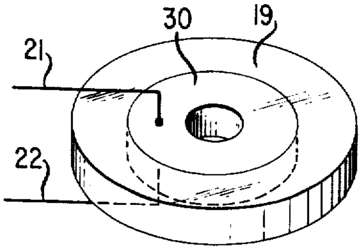

FIGS. 5A and 5B illustrate poling and driving arrangements for transducers for one embodiment of the type illustrated in FIG. 1 using the radial mode of propagation. Since these details for each transducer are essentially the same, only the input transducer is shown in FIGS. 5A and 5B. This transducer is advantageously a disk of piezoelectric ferroelectric, ceramic material such as the mixture lead zirconate titanate commonly designated PZT5A by the various manufacturers, e.g., Clevite Corporation. The disk thickness $t$ is selected to have a value appropriate to the frequency range of signals which are to be applied to the waveguide. Thus, $t$ is approximately equal to one-half of a shear wavelength at the center frequency so that the disk is resonant in shear at that frequency.

In FIG. 5A the transducer 19 is provided with a central conductive insert 27 which advantageously extends through the entire thickness of the transducer disk. The diameter of the insert 27 is the smallest diameter which is convenient for handling and in any case it is much smaller than the diameter of the core 12 of the FIG. 1 waveguide. In addition, a conductive metal film band 28, having a width approximately the same as the thickness of the transducer disk, is applied to the periphery of the disk. Next a direct current electric field is applied (by means not shown) between the insert 27 and the band 28 with a sufficient magnitude and duration appropriate to polarize the transducer 19 in a radial direction about the insert 27 as indicated by arrows, such as the arrows 29 in FIG. 5A. This field must be of a sufficient magnitude also to assure the poling of the transducer in the annular region thereof which will overlie the core cross-sectional region of maximum displacement illustrated in FIG. 2. Once the transducer has been thus poled, insert 27 and band 28 can be removed, although removal is not essential to successful operation of the transducer.

FIG. 5B depicts the transducer 19 with the band 28 and insert 27 removed. The transducer now has applied to opposite faces thereof a pair of centrally located metallic contact films, each of which is in the shape of an annulus. These contacts 30 are located on the transducer faces over the polarized regions of maximum particle displacement in the waveguide displacement-versus-radius characteristic of FIG. 2. The outside diameter of each contact 30 should be approximately the diameter of the waveguide core 12. The inside diameter of each contact 30 is not critical; and, in fact, it can be zero if the poling insert 27 is removed from the disk prior to assembly thereon of the contacts 30. Outside diameter of transducer 19 is not critical and is for convenience illustratively shown as being the same as the cladding diameter. Contact 30 and its associated lead 22, which are adjacent to the end face of the waveguide when mounted as illustrated in FIG. 1, are advantageously formed by thin film plating to assure uniform contact between the transducer surface and the end face of the waveguide. It has been found that the presence of the contact 30 and lead 22 at this transducer-waveguide interface does not significantly distort the operational effect of the transducer on the waveguide.

One alternative arrangement for the transducer is the inverse of that illustrated in FIGS. 5A and 5B, i.e., transducer disks with orthogonal poling and radial drive. The latter configuration eliminates the necessity for a lead and a contact at the interface between the transducer and the waveguide. However, the capacitance of this driving structure is much less than that of FIG. 5B; hence, the impedance of this arrangement is much higher.

Figure 6:
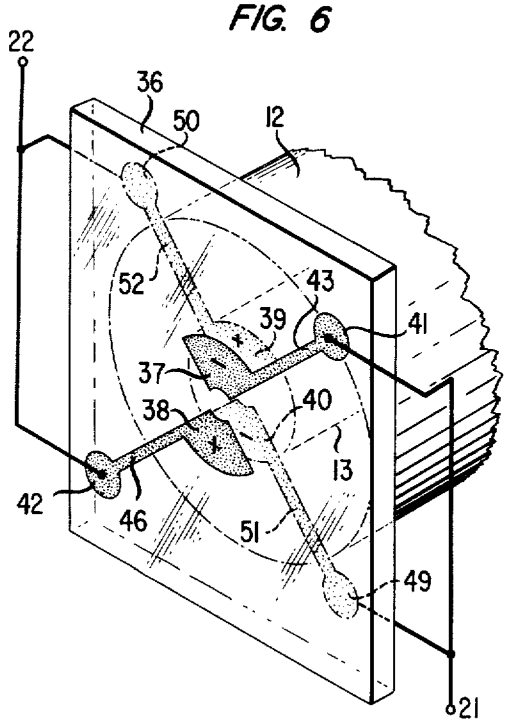
FIG. 6 is a perspective view of another transducer that is useful in the embodiment of FIG. 1.

Waveguides of the present invention can also be driven by bulk shear wave transducers by using a sectored electrode pattern. An example of such a transducer is shown in FIG. 6, and it comprises a square plate 36 of X-cut lithium niobate with the X axis normal to the face of the plate and a sectored electrode pair oriented for torsional wave excitation. This transducer is also described in terms of the driving transducer application. The plate is centered on the waveguide cylindrical axis and extends laterally somewhat beyond the periphery of the cladding 13. The thickness of the plate 36 in the direction of the cylindrical axis of the waveguide is determined the same as for the thickness of the transducers in FIGS. 5A and 5B. The particle displacement in plate 36 is along the horizontal, as oriented in FIG. 6, to allow torsional wave excitation.

Radial wave excitation is accomplished in an identical configuration to that given in FIG. 6 with the exception that the particle displacement of the bulk shear wave transducer plate 36 is along the vertical. Drive electrodes 37 and 38 are applied to the exposed side of the transducer, and electrodes 39 and 40 are applied to the waveguide side of the transducer. Each electrode covers essentially one quadrant of the circular projection of the core 12 cross section. The pair of electrodes on a side of the plate 36 are in the vertically (as illustrated) diametrically opposed quadrants and electrically separate from one another. The electrodes on the other side of the plate lie in the corresponding quadrants so that they face electrodes on the first side. The pairs of electrodes on the respective sides of the plate 36 are driven in opposite phase as indicated schematically by polarity signs on the electrodes in the drawing.

Electrical connections for either driving or receiving are made in the same way. Thus for purposes of driving the waveguide in the radial mode (shown in FIG. 6), the leads 21 and 22 from driver 10 are coupled to electrodes 37 and 38, respectively, by way of connection pads 41 and 42 and respective leads 43 and 46 from those pads to the corresponding electrodes 37 and 38. The pads 41 and 42 are located in diagonally opposed corners of the plate 36 at points outside the periphery of the cladding 13. Connecting leads 43 and 46 extend essentially along the plate diagonal to the nearest one of the electrodes 37 and 38. In a similar fashion the leads 21 and 22 are connected to electrodes 40 and 39, respectively, by way of connection pads 49 and 50 and connecting leads 51 and 52, respectively. However, the pads 49 and 50 are located at opposite ends of the other diagonal of the plate 36.

Although the transducer of FIG. 6 can be used for either torsional or radial mode operation by appropriate selection of the crystal orientation, it requires four electrodes and requires high drive signals because of the low electrode area. These difficulties are reduced by a transducer adapted exclusively for torsional mode operation.

Figure 7A:
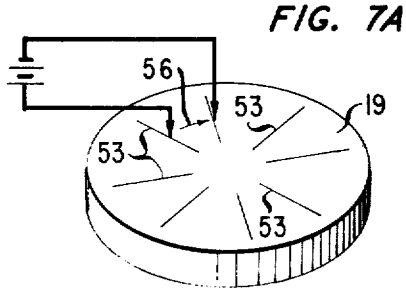
FIGS. 7A and 7B are perspective views of poling and driving arrangements respectively, for a further transducer that is useful in the embodiment of FIG. 1.
Figure 7B:
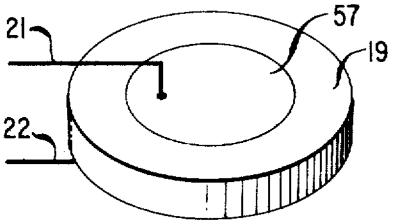

In FIG. 7A is shown a disk transducer for the torsional mode of propagation. Here a transducer 19 of the same material and configuration as in FIG. 5B is employed, except that it usually does not include a central aperture. In this case, the disk is circularly poled by application of a direct current field of suitable magnitude between successive pairs of radial electrodes 53 on one face of the disk. When each pie-shaped segment of the disk has been thus poled in the same circular direction (shown clockwise by arrow 56 in FIG. 7A), the radial electrodes are replaced by circular electrodes 57 in FIG. 7B, one electrode on each face of the transducer 19. As in the case of FIG. 5B, electrodes 57 have approximately the same diameter as core 12 and are placed to cover the core cross section region of maximum angular displacement $U_\theta$. The electric field normal to the plane of the disk for driving is applied between, and for receiving is derived from, the latter electrodes. The transducer of FIG. 7B has several advantages over the FIG. 6 embodiment in that there are fewer drive electrodes, fewer stray capacitance effects, no chance of arcing between adjacent electrode segments on one side of a disk, and better electrode coverage of the core-end region of maximum particle displacement.

It is sufficient to note that the velocity differences produced as already discussed in regard to FIG. 3 for the torsional mode are correspondingly produced in the radial modes. Thus, the enclosed core waveguide operates in either of the radial and torsional displacement modes to bring particle displacement near to zero at the enclosure outer surface, i.e., at $r = b$.

Fundamental mode propagation can be obtained for larger diameter waveguides in the clad-core geometry than in unclad waveguides because the effective velocity difference, $\Delta v/v$, between the core and its surroundings, can be chosen to be a smaller value. That is, a smaller velocity difference can be chosen to allow an increase in either cutoff frequency or core radius when the other is fixed. More specifically, the next higher order angularly symmetric torsional mode, $T_{02}$, for the core-clad structure occurs at $$f_{c_{T_{02}}} \approx 2.25 f_{c_{T_{01}}} \approx \frac{0.61 V_{S2}}{a \sqrt{\frac{\Delta V}{V_{S1}}}}, \quad \frac{\Delta V}{V_{S1}} << 1 .$$

while for the unclad rod, the next higher order torsional mode, $T_{01}$ (the $T_{00}$ mode is the lowest in that case), occurs at $$f_{c_{T_{01}}} \approx 0.82 \frac{V_{S1}}{a}$$

The larger size of the core allows larger transducer drive electrode dimensions which are more easily fabricated and aligned on the waveguide, the alignment being that of the electrode pattern with respect to the guide axis. The larger transducer dimensions also yield immunity from stray circuit capacitance because of the larger electrode areas and higher transducer capacitance. The ability to select the size of the core, and thus of the driving transducer electrodes, by selecting the core-cladding velocity difference $$\frac{\Delta v}{v},$$

also leads to the ability to select the impedance level of the transducer and thus to optimize the bandwidth of the driving circuit. These size and impedance considerations contribute to enhanced efficiency in waveguide operation.

Figure 8:
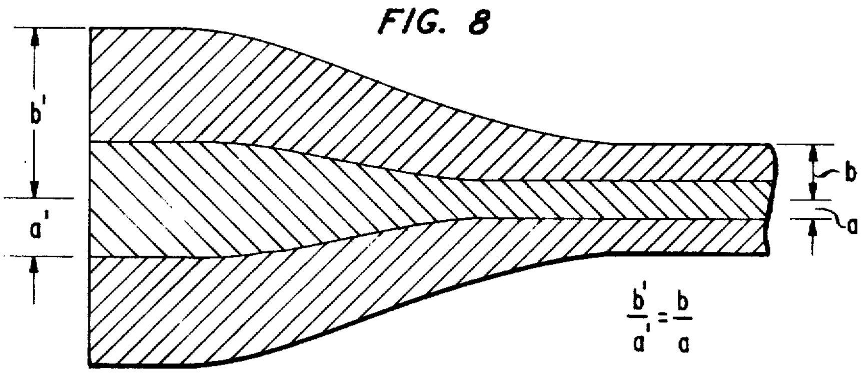
FIG. 8 is a cross sectional view of an end portion of a modified waveguide in accordance with the present invention.

In spite of the advantage of relatively large core diameter as just noted, waveguides in some high frequency ranges may be so small that the application of transducers is difficult. In such cases, the ends of the guide are advantageously formed with an enlarged tapering diameter as illustrated in the longitudinal cross-sectional view in FIG. 8. If the waveguide is formed in a fiber drawing operation, the tapered ends are naturally formed; and the core and cladding radii remain in the same proportion ($b'/a' = b/a$) at any of the taper transverse cross sections as in the main part of the guide. It has further been found that the waveguide electrical input impedance looking into the transducer (not shown in FIG. 8) is a function of the core diameter. Consequently, an appropriate selection of taper transverse cross section yields an input impedance that matches the driving, or receiving, circuit impedance.

Figure 9A:
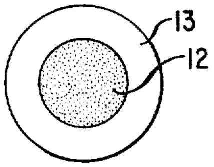
FIGS. 9A and 9B are diagrams illustrating two different core-enclosing techniques for waveguides in accordance with the present invention.
Figure 9B:
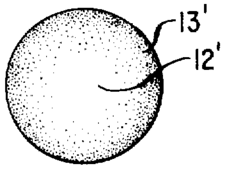

Although the waveguide of the present invention has been illustrated in FIG. 1 as a guide having discrete core and cladding regions, it need not always be formed in that fashion. FIG. 9A illustrates a cross section of the waveguide with the discrete central core 12 and outer cladding 13. Either core or cladding or both can be doped to secure a desired velocity difference but homogeneous core doping is schematically illustrated. Also, different compatible materials can be used in the core 12 and cladding 13 to effect the desired velocity difference. FIG. 9B illustrates one alternative arrangement in which a doping is applied to an otherwise homogeneous elongated fiber member in order to produce a concentration in the cladding region 13′ which is graded so that the doping has a lower concentration in the inner portions of the cladding region. As previously indicated, the FIG. 9B type of waveguide arrangement has an enlarged frequency range of essentially zero normalized dispersion at the group velocity minimum and thus has an enlarged bandwidth of low dispersion for single-mode waveguide operation. Also, reduced mode-to-mode dispersion can be expected by this graded doping profile.

Material doping techniques known in the optical fiber art, for both a substantially uniform doping level in a member and graded doping levels at different radii for changing the index of refraction, are also advantageously utilized in fabricating waveguides in accordance with the present invention to change elastic shear wave velocity. In addition, and apart from the aforementioned doping technique used in optical devices, other techniques are known in the art to achieve either a discrete or a graded doping concentration in the waveguide. The particular technique employed to form the waveguide may vary with the materials used.

The materials employed in waveguides constructed according to the present invention can vary considerably within the range of the requirements for low waveguide loss, low waveguide dispersion, and (if a delay line application is involved) low propagation velocity for the desired mode. In addition, the materials must be capable of being formed or composed to achieve a propagation velocity difference between core and cladding regions for good guiding effect and for the aforementioned low dispersion.

One waveguide which has been found to yield satisfactory results as a discrete core and cladding guide is operated with a cutoff frequency of about 20 MHz. The core material is pure fused silica doped to a concentration of about 7 percent by weight of titanium dioxide. Such material is commercially available as Corning 7971 material of the Corning Glass Company, and it has a temperature coefficient of expansion of about zero in the range of about 20° to 1500°C. The doping is made essentially uniform throughout the thickness and length of the core. That core had an outside diameter of approximately 0.5 millimeter. The cladding used in conjunction with that core was pure fused silica, such as Corning 7940 material, having a compatible temperature coefficient that allows manufacture of a waveguide without cracking. That cladding had an outside diameter of about 1 millimeter or greater. It can thus be seen that the core diameter is on the order of several wavelengths of the cutoff frequency for the waveguide; and the cladding outside diameter is at least twice the core outside diameter, i.e., the cladding thickness is at least one and one-half wavelengths of the waveguide cutoff frequency.

Another set of materials that can be used for a waveguide in the same frequency range includes a pure fused silica core, and a cladding of the same material doped to approximately the same concentration percentage with alumina. Likewise in some applications, it may be advantageous to apply doping to both the core and the cladding materials.

Certain single crystal materials may also be advantageously used in the clad-core waveguide. An example is a *c*-axis aluminum oxide or lithium niobate single crystal fiber core with a fused beryllium oxide or magnesium oxide cladding. The aluminum oxide fibers are available commercially from Tyco Corporation, and the indicated cladding can be coated on the core material by chemical vapor deposition techniques. The mode shapes are modified somewhat by the anisotropy of crystalline aluminum oxide. However, they are substantially the same as the torsional and radial modes previously discussed. Hence, the same methods of transduction and same dimensional design criteria may be employed. Single crystal materials such as aluminum oxide have a much lower intrinsic propagation loss for elastic waves than do amorphous materials such as fused silica. Hence, much longer delays are possible in a waveguide fabricated of a single crystal core. The disadvantages of this kind of structure are that its manufacture would be more complex and costly than for the fused materials discussed previously.

A still further example of possible waveguide materials includes a hollow tube (such as fused silica) filled with a low acoustic loss liquid. The shear and longitudinal velocities of the bulk tubing material should exceed the longitudinal velocity of the liquid core. Suitable low-loss liquids include water, mercury, gallium, carbon tetrachloride, and other simple symmetric organic molecules. The modes of such a liquid filled waveguide are advantageously excited with bulk longitudinal transducers bonded to the end of the tube. The liquid filled waveguide should have the advantage of no temperature induced strains between core and cladding. A small hole (not shown) in the side of the tube, or enclosing member, is required for expansion relief and filling.

Figure 10:
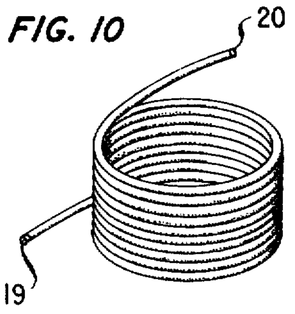
FIG. 10 illustrates a coiled waveguide in accordance with the present invention.

For signal transmission paths with long delay, a straight waveguide as illustrated in FIG. 1 may be inconvenient. Frequency ranges usually dictate small guide diameters; and, thus, the clad waveguide can be coiled either by itself or around another suitable object in order to occupy a more convenient space. Such a coiled waveguide arrangement is illustrated in FIG. 10. The principal precaution to be observed is that the radius of curvature of the bend in the waveguide be kept large enough to avoid the introduction of significant disturbances in the energy being propagated through the waveguide.

The foregoing discussion has been concerned primarily with the elastic torsional and radial waveguide modes of propagation. However, suitable single-mode propagation can be realized with appropriate transducers in the longitudinal mode. For that purpose the core longitudinal velocity should be less than both the cladding shear velocity and the cladding longitudinal velocity in order to provide an advantageous waveguiding effect. The longitudinal mode has both longitudinal and radial particle displacements ($U_z$ and $U_r$); however in this case the longitudinal component dominates so that the maximum energy density occurs at the center of the core away from the core-cladding boundary. Transduction into this mode is achieved simply with bulk longitudinal wave transducers. Suitable materials for this type of waveguide include, for example, a core material of chalcogenide glass and a cladding material of pure fused silica.

Figure 11:
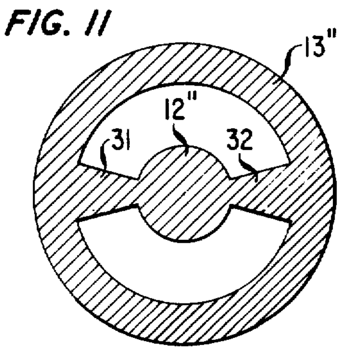
FIG. 11 is a cross sectional view of a modified waveguide according to the present invention.

FIG. 11 depicts in cross section another embodiment of the invention in which the core and enclosing regions are spaced apart. The material is entirely homogeneous with a small wedge shaped membrane supporting the central rod which is the waveguide. Mechanical properties of the structure are utilized to focus energy toward the core. This embodiment has the disadvantages that fabrication is more complex than in previously discussed embodiments, and the waveguide should be evacuated to avoid air loading. However, this guide is formed of a single material, and it illustrates a different technique for containing the elastic waves in a central core to enable noninterfering support.

In FIG. 11 a central core member 12'' is supported within, but spaced from, an enclosing, or cladding, tube member 13''. Spacing is achieved by diametrically opposed longitudinally extending ribbons 31 and 32. All of the elements 12'', 13'', 31, and 32 are advantageously of pure fused silica. The guide is advantageously formed by assembling core, cladding, and ribbons in enlarged form; heating the assembly to fuse the ribbons to the core and cladding; and then, while heated, drawing the assembly down to the desired dimensions. Ribbons 31 and 32 extend along the full length of core 12'' and are tapered down to a thickness much smaller than the core diameter adjacent to the core surface so that the ribbon subtends a small angle on the core. Tapering of support ribbons as shown makes the structure less rigid next to the core than at the tube and focuses particle motion toward core 12'' for all of torsional, longitudinal, and radial modes of elastic wave propagation. Transducers are applied for exciting the different modes, respectively, in the core as already described for other solid core embodiments.

For the radial mode of propagation a transducer of the type shown in FIGS. 5A and 5B excites a Rayleigh wave motion along the longitudinal surface of core 12''. Such a wave has a higher velocity at points of sharp curvature (where the ribbons join the core) than at points of gentler curvature (between such junction points on the core surface), and the energy is thus focused onto the cylinder so there is to substantial particle displacement component at the cladding surface. Similarly, torsional excitation produces a flexural motion in the ribbons; and that is focused toward the thinnest part of the wedge, i.e. toward core 12'', and also prevents leakage from the core. Also longitudinal excitation has a higher velocity in the thicker parts of the ribbons than in the thinner parts and again focuses energy onto core 12''.

Although the present invention has been described in connection with particular embodiments thereof, it is to be understood that additional embodiments, modifications, and applications which will be obvious to those skilled in the art are included within the spirit and scope of the invention.

What is claimed is:

1. In combination, an elongated member comprising a flexible fiber core of a material in which elastic waves can be propagated, an enclosing member surrounding all surfaces except end surfaces of said elongated member and comprising a tube of the same material as said core, means for supporting said elongated member within said enclosing member, said supporting means including means for focusing elastic wave energy inward toward said elongated member so that the particle displacement profile of the combined elongated member, enclosing member, and supporting means in response to a propagating elastic wave has substantially zero amplitude at a radius, from the central longitudinal axis of said elongated member, which is no greater than the outer radius of said enclosing member, and said supporting means and included focusing means including at least one ribbon of said material extending between an inside wall of said tube and said core to hold said core in spaced relation with respect to said tube, said ribbon extending along the length of said core and having a tapered cross section of decreasing thickness from said tube to said core.

2. In a waveguide for elastic waves, a core region of a material in which bulk elastic waves can be propagated, said core region having a diameter which is at least two wavelengths of elastic wave energy at the cutoff frequency $f_{co}$ of the lowest mode for said waveguide, a cladding region enclosing all surfaces except end surfaces of said core region, said cladding region also being of a material in which bulk elastic waves can be propagated, and at least one of said core region and said cladding region including means for focusing elastic wave energy toward said core region.

3. The waveguide in accordance with claim 2 in which said lowest mode is the principal mode propagated in said waveguide, said core region diameter and said core region and cladding region materials being selected so that said cutoff frequency is of the form $$f_{co} \approx \frac{k_1 v_1}{a \dfrac{\Delta v}{v_1}}$$

for normalized velocity differences $$\frac{\Delta v}{v_1} << 1$$

and where $k_1$ is a constant determined by an approximately circular cross-sectional geometry of said waveguide, $v_1$ and $v_2$ are the phase velocities of said core region and cladding region, respectively, $\Delta v$ is the difference between those velocities, and $a$ is the radius of said core region, and the cutoff frequency for the higher mode in said waveguide is approximately $k_2$ times larger than the first-mentioned cutoff frequency.

4. In a waveguide for elastic waves, a core region of a material in which bulk elastic waves can be propagated, a cladding region including a tube enclosing all surfaces except end surfaces of said core region, said cladding region also being of a material in which bulk elastic waves can be propagated, and at least one of said core region and said cladding region including means for focusing elastic wave energy toward said core region, said focusing means comprising at least one ribbon supporting said core region within said cladding region and in spaced relation from an inner surface of said tube, said ribbon extending along said core and having a tapered cross section of decreasing thickness from said tube to said core.

5. In a waveguide for elastic waves, a core region of a liquid material in which bulk elastic waves can be propagated with a predetermined bulk longitudinal velocity, a cladding region enclosing all surfaces except end surfaces of said core region, said cladding region also being of a material in which bulk elastic waves can be propagated, and said cladding region material being a solid having a bulk shear velocity which is greater than said predetermined longitudinal velocity of said liquid material for focusing elastic wave energy toward said core region.

6. In combination, an elongated member of a material in which elastic waves can be propagated, said member having an approximately circular cross section, a cladding on all surfaces except end surfaces of said member, said cladding also being of a material in which elastic waves can be propagated, the materials of said elongated member and said cladding being sufficiently different in character to have different shear wave velocities, with said elongated member having the lower such velocity so said member and cladding comprise a waveguide for elastic waves, and said cladding having a substantially uniform radial thickness which is a finite value dependent upon the particle displacement profile of the combined member and cladding materials, said thickness being large enough so that said profile falls substantially to zero at a waveguide radius which is no greater than the outer radius of said cladding.

7. The combination in accordance with claim 6 in which, said elongated member material is fused silica doped with titanium dioxide in sufficient percentage to provide said lower bulk shear wave velocity, and said cladding material is fused silica.

8. The combination in accordance with claim 6 in which, said elongated member material is fused silica, and said cladding material is fused silica doped with a sufficient percentage of alumina to provide said bulk shear wave velocity difference.

9. The combination in accordance with claim 6 in which said elongated member is a single crystal material.

10. The combination in accordance with claim 6 in which, said member material and said cladding material are the same except that at least one thereof is doped with a sufficient percentage of a different material to produce said bulk shear wave velocity difference.

11. The combination in accordance with claim 10 in which, said doping percentage concentration is graded with respect to waveguide radius over at least a portion of the radius of said waveguide to provide a relatively smooth transition between said different shear wave velocities.

12. The combination in accordance with claim 11 in which said doping percentage concentration is graded from a maximum concentration at the outer surface of said cladding to reduced concentrations with decreasing radii.

13. The combination in accordance with claim 6 in which, said waveguide is suspended in a motion absorbing material for cushioning said waveguide to protect it against external mechanical shock.

14. The combination in accordance with claim 6 in which said waveguide includes end portions of substantially enlarged cross sectional diameter as compared to an intermediate portion of said waveguide, and the cross sectional diameter of said waveguide is gradually tapered between each of said end portions and said intermediate portion.

15. The combination in accordance with claim 6 in which means are provided at at least one end of said waveguide for electromechanically transducing between electrical signals and elastic displacement signals, said transducing means comprising a member of piezoelectric material in contact with said one end, and electrode means secured to said piezoelectric member for bidirectionally coupling an electric field corresponding to either said electrical signals for one direction of tranducing or a predetermined mode of said elastic signals for the other direction of transducing.

16. The combination in accordance with claim 15 in which said piezolelectric member is a rectangular plate in intimate contact with said end of said waveguide, and said electrode means comprise a first pair of spaced electrodes on one face of said plate and in diametrically opposed quadrants of a projection on such face of the cross section of said elongated member, a second pair of spaced electrodes on the opposite face of said plate and in the corresponding quadrants of a projection on such face of the cross section of such elongated member, and electric circuit connections to said first and second pairs of electrodes for coupling electric signals of predetermined phases.

17. The combination in accordance with claim 16 in which said plate is oriented so that the particle displacement is in a direction parallel to the direction of diametric opposition of said first pair of electrodes, and said electric circuit connections include means for coupling said electric signals at said first and second pairs of electrodes in opposite phases for radial mode propagation in said waveguide.

18. The combination in accordance with claim 16 in which
said plate is oriented so that the particle displacement is in a direction perpendicular to the direction of diametric opposition of said first pair of electrodes, and
said electric circuit connections include means for coupling said electric signals at said first and second pairs of electrodes in opposite phases for torsional mode propagation in said waveguide.

19. The combination in accordance with claim 15 in which
said piezolelectric member is a disk of ferroelectric ceramic material, said disk being electrically polarized in a circular direction in the plane of the disk, and
said coupling means comprises electrodes arranged for coupling said electric field in a direction normal to the plane of the disk.

20. The combination in accordance with claim 15 in which,
said piezoelectric member is a disk of ferroelectric material, said disk having a first direction which is radial with respect to the center thereof and a second direction which is orthogonal with respect to a face thereof, said disk being electrically polarized in one of said first and second directions, and
said coupling means comprises electrodes arranged for applying said field to said disk in another of said first and second directions.

21. The combination in accordance with claim 20 in which said coupling means comprises,
an annular electrode film on each face of said disk, and
the outside diameter of said annular film being approximately the same as the outside diameter of said elongated member so that said film covers a region in said elongated member of maximum particle displacement during elastic wave propagation.

22. The combination in accordance with claim 6 in which the outside diameter of said cladding is at least twice the outside diameter of said elongated member.

23. The combination in accordance with claim 6 in which,
said member and cladding materials also have predetermined respective bulk wave longitudinal velocities, and
the longitudinal velocity of said member is less than the bulk shear wave velocity of said cladding.

24. The combination in accordance with claim 23 in which,
said member material is chalcogenide glass, and
said cladding material is fused silica.

25. The combination in accordance with claim 6 in which said elongated member and said cladding thereon have a particle displacement profile with respect to waveguide radius during propagation of an elastic wave, which profile is
substantially symmetrical about a central longitudinal axis of said waveguide, and
has a maximum displacement region within said elongated member.

26. An acousto-electric signal transducer for an elastic waveguide having a predetermined particle displacement profile characteristic for a transverse cross section thereof, said transducer comprising
a plate of piezoelectric material, said plate being oriented for particle displacement in a predetermined direction in response to application of an electric field to said plate,
means for coupling electric signals either to or from said plate at different surfaces of said plate such that an electric field extending between said surfaces and corresponding to said signals is normal to said particle displacement direction, said coupling means including electrodes placed so that when said plate is placed contiguous to an end cross section of said waveguide, said electric field covers maximum displacement portions of said profile, and
said coupling means electrodes comprise
a first pair of electrodes spaced from one another on a first one of said surfaces,
a second pair of electrodes spaced from one another on a second one of said surfaces, said first and second surfaces being parallel to one another and the electrodes of said second pair being located in positions opposite to electrodes of said first pair, respectively, and
electric circuit connections to said first and second pairs of electrodes for coupling electric signals of predetermined different phases.

27. The transducer in accordance with claim 26 in which
said plate particle displacement is in a direction parallel to a line between centers of electrodes of said first pair, and
said circuit connections include means for coupling said electric signals at said first and second pairs of electrodes in opposite phases for radial mode excitation in said plate.

28. The transducer in accordance with claim 26 in which
said plate particle displacement is in a direction perpendicular to a line between centers of electrodes of said first pair, and
said circuit connections include means for coupling said electric signals at said first and second pairs of electrodes in opposite phases for torsional mode excitation in said plate.

29. An acousto-electric signal transducer for an elastic waveguide having a predetermined particle displacement profile characteristic for a traverse cross section thereof, said transducer comprising
a plate of piezoelectric, ferroelectric, ceramic material, said plate being poled in a circular direction in the plane of the plate and being oriented for particle displacement in a predetermined direction in response to application of an electric field to said plate,
means for coupling electric signals either to or from said plate at different surfaces of said plate such that an electric field extending between said surfaces and corresponding to said signals is normal to said particle displacement direction, said coupling means including electrodes placed so that when said plate is placed contiguous to an end cross section of said waveguide said electric field covers maximum displacement portions of said profile, and
said coupling means electrodes are in corresponding positions on opposite faces of said plate and centrally located over the region of circular poling in said plate.

30. An acousto-electric signal transducer for an elastic waveguide having a predetermined particle displacement profile characteristic for a transverse cross section thereof, said transducer comprising a plate of piezoelectric, ferrroelectric, ceramic material, said plate having a first direction which is radial with respect to a predetermined center location therein and having a second direction which is normal to a major surface of said plate, said plate being poled in one of said first and second directions, and means for coupling electric signals either to or from said plate at different surfaces of said plate, and in another of said first and second directions, such that an electric field extending between said surfaces and corresponding to said signals is normal to said particle displacement direction, said coupling means including electrodes placed so that when said plate is placed contiguous to an end cross section of said waveguide said electric field covers maximum displacement portions of said profile.

* * * * *

UNITED STATES PATENT AND TRADEMARK OFFICE

CERTIFICATE OF CORRECTION

PATENT NO. : 3,922,622

DATED : November 25, 1975

INVENTOR(S) : Gary D. Boyd and Larry A. Coldren

It is certified that error appears in the above-identified patent and that said Letters Patent are hereby corrected as shown below:

In the Specification, column 13, line 49, "to" should read --no--.

Signed and Sealed this

*thirtieth* Day of *March 1976*

[SEAL]

*Attest:*

RUTH C. MASON
*Attesting Officer*

C. MARSHALL DANN
*Commissioner of Patents and Trademarks*

UNITED STATES PATENT AND TRADEMARK OFFICE

CERTIFICATE OF CORRECTION

PATENT NO. : 3,922,622

DATED : November 25, 1975

INVENTOR(S) : Gary D. Boyd and Larry A. Coldren

It is certified that error appears in the above-identified patent and that said Letters Patent are hereby corrected as shown below:

Claim 3, column 14, line 47, "$f_{co} \approx \frac{k_1 v_2}{a \frac{\Delta v}{v_1}}$" should read $$--f_{co} \approx \frac{k_1 v_2}{a\sqrt{\frac{\Delta v}{v_1}}}--.$$

Signed and Sealed this

*Twentieth* Day of *December 1977*

[SEAL]

*Attest:*

RUTH C. MASON
*Attesting Officer*

LUTRELLE F. PARKER
*Acting Commissioner of Patents and Trademarks*